(12) United States Patent
Cho et al.

(10) Patent No.: US 8,467,579 B2
(45) Date of Patent: Jun. 18, 2013

(54) APPARATUS AND METHOD FOR ESTIMATING DISTANCE AND POSITION OF OBJECT BASED ON IMAGE OF SINGLE CAMERA

(75) Inventors: Joon-Myun Cho, Daejeon (KR); Kang-Woo Lee, Daejeon (KR); Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 434 days.

(21) Appl. No.: 12/827,297

(22) Filed: Jun. 30, 2010

(65) Prior Publication Data
US 2011/0135157 A1 Jun. 9, 2011

(30) Foreign Application Priority Data
Dec. 8, 2009 (KR) .................. 10-2009-0121207

(51) Int. Cl.
*G06K 9/00* (2006.01)

(52) U.S. Cl.
USPC .......................................................... 382/106

(58) Field of Classification Search
USPC .......................................................... 382/106
See application file for complete search history.

(56) References Cited

U.S. PATENT DOCUMENTS

| | | | | |
|---|---|---|---|---|
| 5,093,680 A | * | 3/1992 | Suzuki et al. ................... | 396/78 |
| 6,215,961 B1 | * | 4/2001 | Mukai et al. ................... | 396/100 |
| 6,298,198 B1 | * | 10/2001 | Ina et al. ......................... | 396/54 |
| 2003/0042440 A1 | * | 3/2003 | Boillot et al. ............ | 250/559.29 |
| 2004/0207743 A1 | * | 10/2004 | Nozaki et al. ............ | 348/333.12 |
| 2005/0270410 A1 | * | 12/2005 | Takayama ..................... | 348/345 |
| 2007/0285528 A1 | * | 12/2007 | Mise et al. ................. | 348/222.1 |
| 2007/0286590 A1 | * | 12/2007 | Terashima ..................... | 396/125 |

FOREIGN PATENT DOCUMENTS

| | | |
|---|---|---|
| JP | 4207980 | 10/2008 |
| KR | 10-0846448 | 7/2008 |
| KR | 1020090083595 | 8/2009 |

* cited by examiner

*Primary Examiner* — Tom Y Lu
(74) *Attorney, Agent, or Firm* — Nelson Mullins Riley & Scarborough LLP; EuiHoon Lee, Esq.

(57) ABSTRACT

Disclosed are an apparatus and a method for estimating a distance and a position between a photographing unit and a predetermined object based on an image of the photographing unit using a single camera. An apparatus for estimating a distance of an object based on a single camera image includes: a region detector detecting an object region box including the predetermined object in an image photographed by a photographing unit; a distance estimator measuring the size of the detected object region box and estimating a distance between the predetermined object and the photographing unit on the basis of an interpolating function interpolating the relationship of the size of the object region box and distances up to the photographing unit and the predetermined object; and a position estimator generating object position information estimating the position of the predetermined object.

15 Claims, 3 Drawing Sheets

USER DISTANCE $dz(df) = \dfrac{dz(df_1) - dz(df_0)}{df_1 - df_0}(df - df_0) + dz(df_0)$ USER DISTANCE $dz(df) = \dfrac{dz(df_1) - dz(df_0)}{df_1 - df_0}(df - df_0) + dz(df_0)$

APPARATUS AND METHOD FOR ESTIMATING DISTANCE AND POSITION OF OBJECT BASED ON IMAGE OF SINGLE CAMERA

CROSS REFERENCE TO RELATED APPLICATIONS

This application claims priority to Korean Patent Application No. 10-2009-0121207 filed on Dec. 8, 2009, the entire contents of which are herein incorporated by reference.

BACKGROUND OF THE INVENTION

1. Field of the Invention

The present invention relates to a technology estimating and tracking a distance and a position of a specific object. More particularly, the present invention relates to a technology that estimates a distance between a camera and a specific object by using a generally used simple apparatus, such as the camera instead of estimating or tracking a distance or a position of a specific object by using expensive equipment or complicatedly calculating information collected by the expensive equipment. Further, the present invention relates to a technology that calculates the position of the specific object on the basis of the estimated distance.

2. Description of the Related Art

A robot application technology is a technological field that is actively researched in a home networking system and an automation system. The robot application technology develops a human-friendly robot technology by interaction between a robot and the human. Accordingly, the interaction between the robot and the human is an important technological factor. Therefore, the robot application technology in which the interaction between the human and the robot has an important part requires a technology where the robot can track a position (coordinate or direction and distance) of a user. As a result, a technology of tracking a position of a specific object such as a user in a specific apparatus such as the robot is being actively researched.

The known object position tracking technology tracks the position of the specific object on the basis of position data of the specific apparatus such as the robot and position vector information from the specific apparatus to the specific object. Herein, since position information measurement instruments such as a navigation and a GPS sensor are incorporated in a control of the specific apparatus such as the robot, the position data of the specific apparatus can be acquired from the controller of the specific apparatus. Accordingly, it is a key point of the object position tracking technology to acquire the position vector information from the specific apparatus to the specific object.

It is important to acquire distance data from the specific apparatus to the specific object in the known technology for acquiring the position vector information from the specific apparatus to the specific object. In the known technology, devices such as a stereo camera, an ultrasonic sensor, a laser sensor, etc., have been used in acquiring the distance data. However, since the devices are expensive, a problem that the user feels a burden of the price cannot be solved at the time of adopting the robot using the devices in a low-cost apparatus such as home robot.

On the contrary, a function to detect a face on the basis of a camera image has been generally universalized to be mounted on a mobile communication apparatus, a toy, etc., in recent years. Further, even in the robot application technology, since the detection function corresponds to a function basically installed and used for user recognition, motion detection, obstacle avoidance, etc., a necessity of the method capable of using the camera image for tracking the position of the object is increasing.

SUMMARY OF THE INVENTION

In accordance with the above-mentioned problems of the known technology and necessity for new technology, there is an object of the present invention to provide an apparatus and a method capable of simply estimating a distance between a specific object and a specific apparatus by using a photographing apparatus such as a camera, etc., basically included in a specific apparatus including a robot. Further, there is another object of the present invention to provide a technology that calculates a position vector of a specific object on the basis of the estimated distance between the specific object and the specific apparatus and simply tracking the position of the specific object by using the calculated position vector.

In order to achieve the above-mentioned objects, according to an embodiment of the present invention, an apparatus for estimating a distance and a position of an object based on a single camera image includes: a region detector detecting an object region box including the predetermined object in an image photographed by a photographing unit; a distance estimator measuring the size of the detected object region box and estimating a distance between the predetermined object and the photographing unit on the basis of an interpolating function interpolating the relationship of the size of the object region box and distances up to the photographing unit and the predetermined object; and a position estimator generating object position information estimating the position of the predetermined object on the basis of a first vector based on the distances up to the predetermined object and the photographing unit, a rotation angle of the photographing unit, a second vector based on a center point of the photographed image and a center point of the object region box, and position information of the photographing unit.

Further, according to another embodiment of the present invention, a method for estimating a distance and a position of an object based on a single camera image includes: allowing a region detector to detect an object region box of a minimize size including the predetermined object from an image photographed by a photographing unit; allowing a distance estimator to measure the size of the object region box and estimating a distance between the predetermined object and the photographing unit on the basis of an interpolating function interpolating the relationship of the size of the object region box and distances up to the photographing unit and the predetermined object; and allowing a position estimator to generate object position information for estimating the position of the predetermined object on the basis of a first vector based on the distances up to the predetermined object and the photographing unit, a rotation angle of the photographing unit, a second vector based on a center point of the photographed image and a center point of the object region box, and position information of the photographing unit.

According to an apparatus and a method for estimating a distance and a position of an object based on a single camera image according to an embodiment of the present invention, it is possible to simply analyze an image of a photographing unit basically mounted on a robot, etc., and estimate a distance between the object and a photographing unit through a simple interpolation function without providing an expensive equipment or complicatedly processing information in the expensive equipment. Further, it is possible to track the position of the object by using the simply estimated distance.

Therefore, it is possible to lower a cost of an object position tracking technology required for robot application, as a result, it is possible to promote popularization of the robot application.

DETAILED DESCRIPTION OF THE PREFERRED EMBODIMENTS

Hereinafter, referring to FIG. 2, an apparatus for estimating a distance and a position of an object based on a single camera image according to an embodiment of the present invention will be described. First, the apparatus for estimating a distance of an object based on a single camera image may be configured by including a configuration up to a distance estimator 202 in a configuration of the present invention. However, it will be apparent to generate object position information estimating an actual position of a predetermined object by using a distance between a photographing unit 200 and a predetermined object, which is estimated by the distance estimator 202. Accordingly, in the embodiment of the present invention, an apparatus for estimating a position of an object based on a single camera image may be additionally included. Hereinafter, both the apparatus for estimating a distance of an object based on the single camera image and the apparatus for estimating a position of an object based on the single camera image will be described. Accordingly, the title of the present invention will generally be referred as an apparatus for estimating a distance and a position of an object based on a single camera image.

Figure 2:
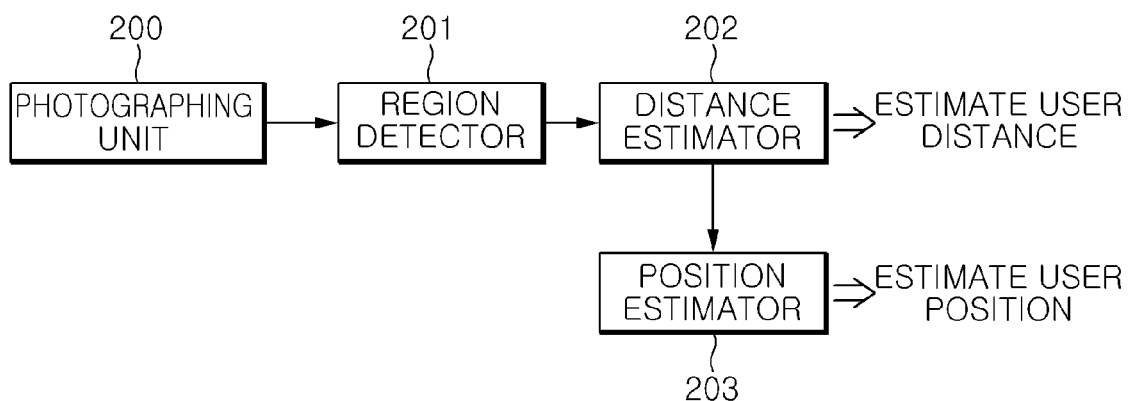
FIG. 2 is an equipment diagram of an apparatus for estimating a distance and a position of an object based on a single camera image according to an embodiment of the present invention.

Referring to FIG. 2, the apparatus for estimating a distance and a position of an object based on the single camera image according to the embodiment of the present invention first includes a region detector 201. The region detector 201 basically receives an image photographed by a photographing unit 200 and analyzes the image photographed by the photographing unit 200 to detect an object region box including a predetermined object. As described above, since the photographing unit 200 is basically mounted on an apparatus such as a robot, etc., the region detector 201 is connected to the photographing unit 200 to receive an image in front of the photographing unit 200 which the photographing unit 200 photographs for user recognition, motion detection, obstacle avoidance, etc. Thereafter, the region detector 201 detects the predetermined object and detects the object region box including the predetermined object.

In the embodiment of the present invention, the predetermined object represents a user's face. Since a position tracking technology in a robot application technology, etc. tracks a position of a user of a robot, etc., and efficiently performs a function using interaction between the user and the robot, it will be preferable that an object is also used to recognize a predetermined object in the embodiment of the present invention. Accordingly, a function to detect a region occupied by the face among features of the user is performed by the region detector 201. However, since the present invention can be used in the robot application technology and various technological fields (i.e., a technology of preventing the loss of goods by tracking goods positioned in a short range, the predetermined object may mean the user's face and an object element capable of utilizing and detecting an image detection function. The object element will be designated in a method of previously storing object information in the region detector 201. Further, the region detector 201 will be used to estimate the distance between the photographing unit 200 and the predetermined object by sharing the object information with the distance estimator 202 to be described below.

In the embodiment of the present invention, the object region box means a rectangular box having a minimum region size, which may include the user's face. As described above, the predetermined object means the user's face in the embodiment of the present invention. Therefore, the object region box will also include the user's face. The predetermined object preferably has a size enough to detect the user's face feature. Further, since object region boxes including user's faces spaced with the same distance have the same size, the unity is required to set the object region box in accordance with the object of the present invention. Therefore, in the embodiment of the present invention, the object region box means a rectangular box having a minimum region size, which includes the user's face. More preferably, the object region box will be a rectangular box having a minimum size including an eye, a nose, and a mouse in which the user's face feature may be expressed, but besides, may include the user's face feature such as a rectangle, etc., that is in contact with a face region and setting the object region box having a predetermined reference will be used by any method. Further, as described above, since all predetermined objects can be detected through the image detection function in addition to the user's face, the object region box will be changed depending on the predetermine objects.

The photographing unit 200 in the embodiment of the present invention is installed at a part of the robot to perform an image photographing function. The photographing unit 200 in the embodiment of the present invention means a camera photographing a single image. Since the image photographed by the photographing unit 200 is used to estimate a distance from the predetermined object and used to estimate the position of the predetermined object on the basis of the estimated distance, the photographing unit 200 will be preferably installed so that a basic gaze direction coincides with the front which the apparatus such as the robot, etc. faces. In addition, the photographing unit 200 is preferably installed so that the gaze or the photographing unit 200 itself rotates at a predetermined angle range.

However, since a formula is simply modified at the time of estimating the position when the position of the photographing unit 200 is changed, the position of the photographing unit 200 means a position suitable for a method for estimating a distance and a position to be described below and the position of the photographing unit 200 will be changeable. Of course, when the position and the basic gaze direction of the photographing unit 200 will not exist on the front of the above-mentioned apparatus, it will be apparent that an estimation formula of a distance and a position of a predetermined object will be different from the formula to be described below. Further, since the photographing unit 200 is installed in the apparatus such as the robot, etc., in the embodiment of the present invention, a distance between the predetermined object and the photographing unit 200 may be defined as a distance between the apparatus such as the robot, etc., and the predetermined object.

The apparatus for estimating a distance and a position of a predetermined object based on a single camera image further includes the distance estimator 202. The distance estimator 202 receives data on the object region box detected by the region detector 201 and measures the size of the object region box. Thereafter, on the basis of the measured size of the object region box, the distance estimator 202 estimates the distance between the predetermined object and the photographing unit 200. An interpolating function interpolating the relationship of the distance between the photographing unit 200 and the predetermined object for the size of the object region box is used to estimate the distance between the predetermined object and the photographing unit 200. The interpolating function means a function to deduce the relationship between data by using a plurality of data that are measured in advance.

The interpolating function in the embodiment of the present invention means a linear interpolating function deduced by setting the size of the object region box as a first variable and the distance between the photographing unit 200 and the predetermined object as a second variable as described above. In the embodiment of the present invention, a pair of variables of the first variable and the second variable corresponding to the first variable are actually measured at two points in advance and the relationship between the first variable and the second variable at two points is deduced to deduce the linear interpolating function. When the zoom or field of view (FOV) (a size value of a view angle of the photographing unit 200) of the photographing unit 200 between the two points is not changed and the object region box is configured to include features of an object at a predetermined size as described above, the size of the object region box is linearly changed in inverse proportion to a distance up to the predetermined object. Accordingly, when the size of the object region box, which is actually measured at two points and distance data between the predetermined object and the photographing unit 200 are utilized as described above, the above-mentioned linear interpolating function may be deduced and distances up to the predetermined object and the photographing unit 200 may be accurately calculated through the linear interpolating function.

Figure 1:
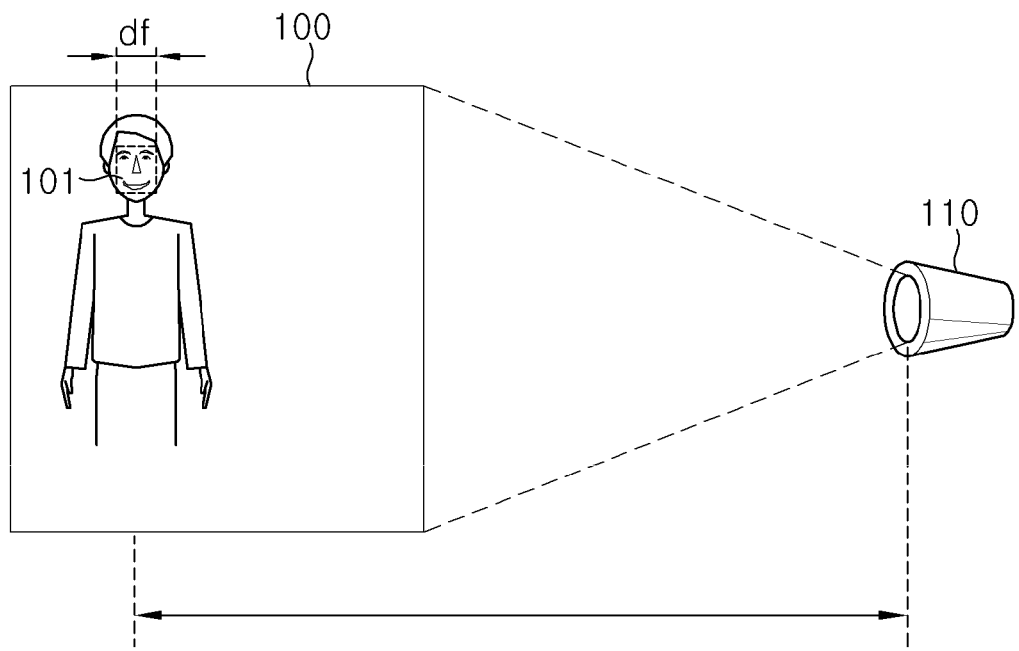
FIG. 1 shows a function of a distance estimator 202 according to an embodiment of the present invention.

An example of estimating the distances up to the predetermined object and the photographing unit 200 in the distance estimator 202 is shown in FIG. 1.

Referring to FIG. 1, the photographing unit 110 is installed in the apparatus such as the robot, etc., to photograph an image in the front of the apparatus or in a predetermined angle range. The image 100 photographed by the photographing unit 110 includes a plurality of objects and should also include an object (i.e., a user's face region of the apparatus) of which a distance needs be estimated among the plurality of objects. The photographing unit 110 transmits the photographed image 100 to the region detector 201 and the region detector 201 analyzes the received image 100 to detect a predetermined object. In addition, the object region box 101 is generated as described above. Data on the object region box 101 is transferred to the distance estimator 202 afterwards. The distance estimator 202 analyzes the received data on the object region box 101 to measure the size of the object region box 101. In the embodiment of the present invention, since the object region box 101 is detected as a rectangular box, the length of one horizontal or longitudinal side is measured and the measured length is set as the size of the object region box 101. Referring to FIG. 1, the length df of one horizontal side of the object region box 101 is defined as the size of the object region box 101, df.

The distance estimator 202 deduces the linear interpolating function by setting actual values at first and second points for the size of the object region box 101, df, the size of the object region box which is actually measured in advance, and actual values of a distance dz from a predetermined object to the photographing unit 110 at first and second points as first variables df0 and dz(df0) and second variables (df1 and dz(df1). A linear interpolating function of the size df of the object region box 101 which is deduced and the distance dz between the predetermined object and the photographing unit 110 deduced by the first variables and the second variables is as follows.

$$dz(df) = \frac{dz(df_1) - dz(df_0)}{df_1 - df_0}(df - df_0) + dz(df_0) \qquad \text{[Equation 1]}$$

On the basis of Equation 1, the distance estimator 202 interpolates and estimates the distance between the predetermined object and the photographing unit 101. The linear interpolating function of the distance estimator 202 may be stored in the distance estimator 202 in order to prevent duplicated deduction when objects of distance and positions are requested to be estimated are the same. Further, in order to improve performance, a plurality of objects may be designated and as a result, when the object is provided in plural kinds (or numbers), a linear interpolating function for each predetermined object deduced to correspond to the predetermined object may be stored in the distance estimator 202.

According to an apparatus and a method for estimating a distance and a position of an object based on a single camera image according to an embodiment of the present invention, it is possible to easily estimate the distance between the predetermined object and the photographing unit 200 by using only the photographing unit 200 and the region detector 201 including the object detection function without complicated calculation or installation of an expensive equipment, thereby contributing to popularization of a robot application technology and a position tracking technology.

The apparatus for estimating a distance and a position of a predetermined object based on a single camera image may also further include the position estimator 203. The position estimator 203 performs a computation function to estimate a position of a user on the basis of data on the distance between the predetermined object and the photographing unit 200, which is estimated by the distance estimator 202. The computation in the position estimator 203 will now be described with reference to FIG. 3.

Figure 3:
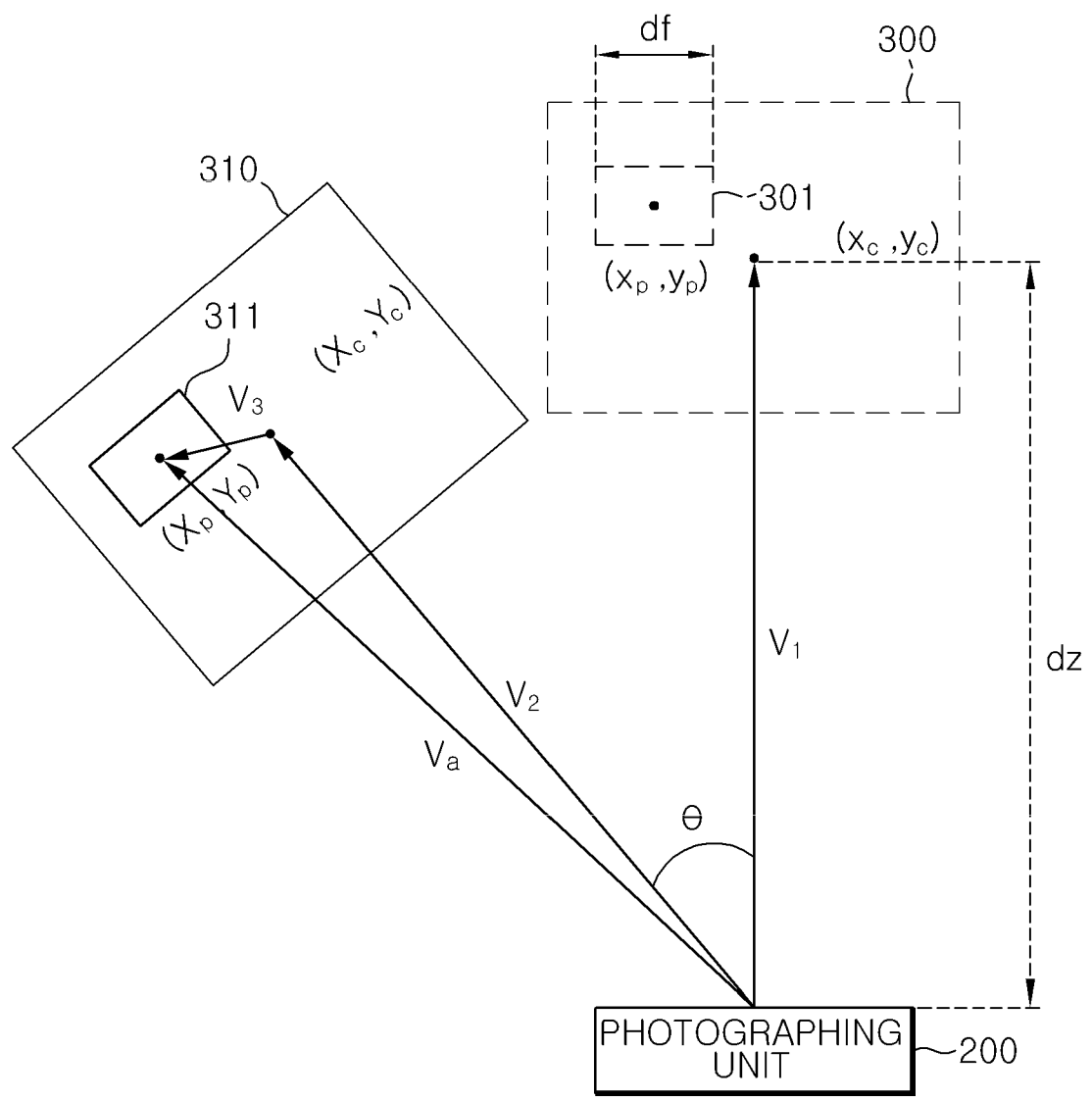
FIG. 3 illustrates calculation of a fourth vector V4 of a position estimator 203 according to an embodiment of the present invention.

Referring to FIG. 3, first, the position estimator 203 receives data of an image including a predetermined object photographed by the photographing unit 200 from the photographing unit 200, the region detector 201, or the distance estimator 202. Therefore, as shown in FIG. 2, the data of the image may be transferred to the position estimator 203 stating from the photographing unit 200 in sequence. Besides, the data of the image may be directly transmitted from the photographing unit 200 to the position estimator 203.

In the embodiment of the present invention, the position estimator 203 estimates the position of the predetermined object by combining a vector Va linking center points of the photographing unit 200 and the predetermined object with position information of the apparatus such as the robot, etc., including the photographing unit 200. As described above, since the position of the apparatus can be easily acquired because a GPS device or a navigation is incorporated in the apparatus such as the robot, etc., it is possible to estimate the position of the predetermined object by combining vector information acquired by converting the vector Va to correspond to the position information of the apparatus with the position information (i.e., GPS coordinate information0 of the apparatus.

As a result, the position estimator 203 according to the embodiment of the present invention performs the computation for acquiring the vector Va and thereafter, performs a function to combine the vector Va with the position information of the apparatus.

The position estimator 203 first sets a first vector V1 using dz, the distance between the predetermined object and the photographing unit 200 received from the distance estimator as a size and a basic photographing gaze direction (i.e., a direction that coincides with a direction which the front of the robot faces) of the photographing unit 200 installed in the apparatus, etc., as described above as a direction. Although the size of the first vector V1 is actually a distance between positions corresponding to center points xc and yc of a photographed image and the photographing unit 200 as shown in FIG. 3, in the embodiment of the present invention, according to an assumption that distances between the center points xc and yc of the image and center points xp and yp of the predetermined object can be disregarded and the necessity of the use of dz, the distance estimated from the distance estimator 202, dz, the distance between the predetermined object and the photographing unit is set as the size of the first vector V1.

When the first vector V1 is set, the position estimator 203 receives data on a rotation angle θ of the photographing unit 200 from the photographing unit 200 or the apparatus where the photographing unit 200 is installed thereafter. The rotation angle of the photographing unit 200 received by the position estimator 203 is defined as an angle that is initially set, that is, basically between a gaze direction, that is, gazed at the time of installing the photographing device (i.e., lens) of the photographing unit in the apparatus and a gaze direction (i.e., a gaze direction of the lens) of the photographing unit 200 at the time of photographing the predetermined object in the embodiment of the present invention. However, as described above, since the installation position of the photographing unit 200 may be changeable depending on the characteristics of the apparatus, it will be apparent that the definition of the rotation angle may also be changeable depending on the position of the photographing unit 200. Thereafter, when the first vector V1 and the rotation angle θ are set, the position estimator generates a third vector V3 having the same size as the first vector V1 and a direction rotating the first vector V1 at the rotation angle θ.

A second vector V2 shown in FIG. 3 means a vector for a position corresponding to center points Xp and Yp of an object region box for a predetermined object at a position corresponding to center points Xc and Yc of an actually photographed image, that is, an image photographed by considering the rotation angle θ. In order to calculate the second vector, the position estimator 203 first analyzes the photographed image to calculate a vector directing from the center point (Xc and Yc) of the photographed image to the center point (Xc and Yc) of the object region box and generates a vector modified to have a size acquired by multiplying the calculated size of the vector by a predetermined value. Therefore, the modified vector is set as the second vector V2.

The predetermined value multiplied by the calculated size of the vector is defined as a ratio of the distance between the center point (Xc and Yc) of the image in the photographed image and the center point (Xp and Yp) of the object region box and a distance between a position corresponding to an actually photographed image and a position corresponding to an actual object region box. The ratio may be easily deduced by analyzing a ratio between a pixel value and an actual distance unit (i.e., meter). Accordingly, the unit of the ratio will be m/pixel.

Thereafter, the position estimator 203 generates a fourth vector V4 by summing up the third vector V3 generated by rotating the first vector V1 and the second vector V2 calculated by considering the rotation angle θ. The fourth vector V4 means a vector linking the photographing unit 200 and the center point (Xp and Yp) of the object region in the actually photographed image. The position estimator 203 converts the fourth vector V4 into vector information which is information of a format corresponding to position information (i.e., GPS information0 of the photographing unit 200 and may estimate object position information by combining the position information of the photographing unit 200 with the vector information.

According to the apparatus for estimating a distance and a position of an object based on a single camera according to the embodiment of the present invention, since it is possible to easily estimate the position of the predetermined object having the position to be tracked through a single photographed image by the photographing unit 200, the linear interpolating function, and the simple analysis and computation including vector calculation, the apparatus for estimating a distance and a position of an object based on a single camera, it is possible to contribute to popularization of the robot application and popularization of the position tracking technology.

Figure 4:
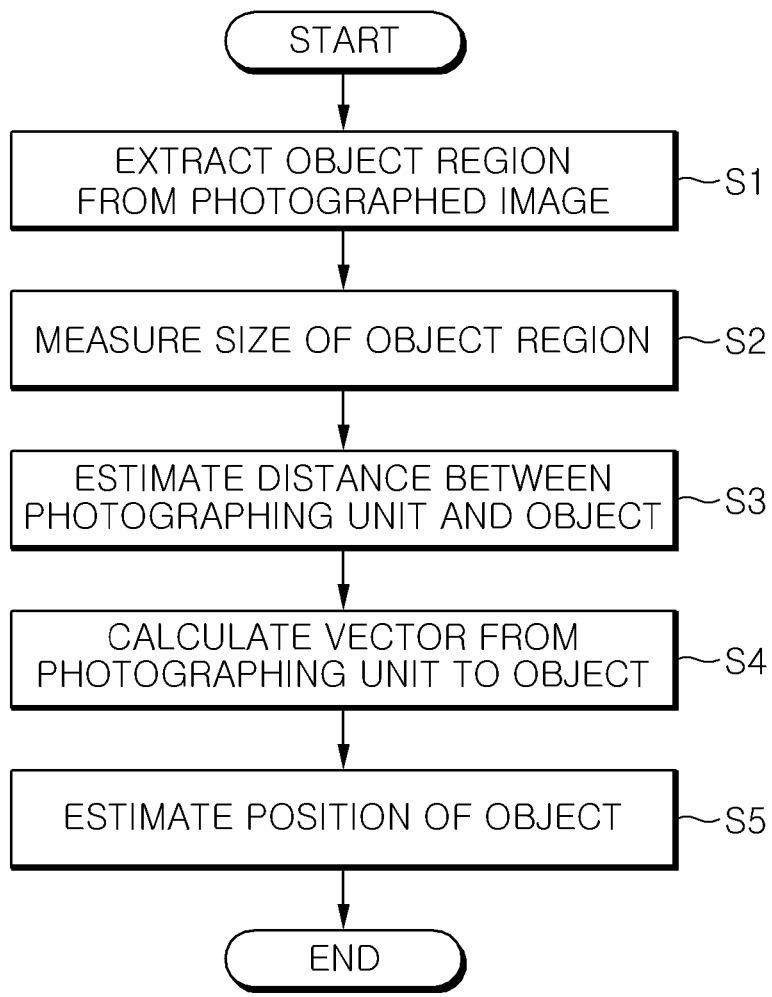
FIG. 4 is a schematic flowchart of a method for estimating a distance and a position of an object based on a single camera image according to an embodiment of the present invention.

Hereinafter, referring to FIG. 4, a method for estimating a distance and a position of an object using the apparatus for estimating a distance and a position of an object based on a single camera according to an embodiment of the present invention will be described. In the following description, the same part as the apparatus for estimating a distance and a position of an object based on a single camera will not be described.

The method for estimating a distance and a position of an object based on a single camera according to the embodiment of the present invention first performs allowing a region detector 201 to extract an object region box of a predetermined object having a position to be tracked by analyzing a photographed image received from a photographing unit 200 (S1). In addition, a distance estimator 202 performs measuring the size of the object region box by receiving the object region box from the region detector 201 (S2). Thereafter, the distance estimator 202 estimates a distance between the photographing unit 200 and the predetermined object on the basis of a linear interpolating function (S3). Meanwhile, when the distance estimator 202 estimates the distance between the photographing unit 200 and the predetermined object, the position estimator 203 receives data on the distance between the photographing unit 200 and the predetermined object from the distance estimator 202. Thereafter, on the basis of the received distance between the photographing unit 200 and the predetermined object, the position estimator 203 performs computing a fourth vector for the predetermined vector from the photographing unit 200 on the basis of a first vector set ad described above, a rotation angle of the photographing unit 200 and a second vector generated based on a vector linking a center point of the photographed image and a center point of the object region box (S4). Lastly, the position estimator 203 performs estimating object position information on the basis of the fourth vector and position information of the photographing unit 200 (S5).

The above description of the apparatus and the method for estimating a distance and a position of an object based on a single camera according to the embodiment of the present invention will be used only for descriptive purposes and does not limit the appended claims. Further, except for the embodiment of the present invention, it will be apparent that an equivalent invention having the same function as the present invention will also be included in the scope of the present invention.

What is claimed is:

1. An apparatus for estimating a position of an object based on a single camera image, comprising:
    a region detector detecting an object region box including a predetermined object in an image photographed by a photographing unit;
    a distance estimator measuring a size of the detected object region box and estimating a distance between the predetermined object and the photographing unit on the basis of an interpolating function interpolating a relationship of the size of the object region box and a distances up to the photographing unit and the predetermined object; and
    a position estimator generating an object position information estimating a position of the predetermined object on the basis of a first vector based on the distances up to the predetermined object and the photographing unit, a rotation angle of the photographing unit, a second vector based on a center point of the photographed image and a center point of the object region box, and position information of the photographing unit.

2. The apparatus for estimating a position of an object based on a single camera image according to claim 1, wherein the predetermined object is a human face and the object region box is a rectangular box of a minimum size including the human face.

3. The apparatus for estimating a position of an object based on a single camera image according to claim 2, wherein the object region box is the rectangular box of the minimum size including all of human eyes, nose, and mouse.

4. The apparatus for estimating a position of an object based on a single camera image according to claim 1, wherein the distance estimator further deducing and storing a linear interpolating function based on the size of the object region box and distance data between the predetermined objects actually measured at two points in advance.

5. The apparatus for estimating a position of an object based on a single camera image according to claim 4, wherein when a plurality of the predetermined objects are provided, the distance estimator further storing the linear interpolating functions deduced with respect to the plurality of the predetermined objects.

6. The apparatus for estimating a position of an object based on a single camera image according to claim 1, wherein the position estimator calculates an angle between a gaze direction of the photographing unit initially set and a gaze direction of the photographing unit at the time of photographing the predetermined object and sets a calculated angle as the rotation angle.

7. The apparatus for estimating a position of an object based on a single camera image according to claim 1, wherein the position estimator generates the first vector by setting the estimated distance between the predetermined object and the photographing unit as a size and a direction of a line linking center points from the photographing unit to the photographed image as a direction.

8. The apparatus for estimating a position of an object based on a single camera image according to claim 1, wherein the position estimator calculates a vector directing the center point of the photographed image to the center point of the object region box, and modifies the calculated vector on the basis of a ratio of the distance between the center point of the photographed image and the object region box and a distance between an actual gaze center line of the photographing unit and the center point of the object and sets the modified vector as the second vector.

9. The apparatus for estimating a position of an object based on a single camera image according to claim 1, wherein the position estimator generates a third vector rotating the first vector at the rotation angle and generates object position information estimating the position of the predetermined object on the basis of a fourth vector acquired by summing up the third vector and the second vector and the position information of the photographing unit.

10. A method for estimating a position of an object based on a single camera image, comprising:
    detecting an object region box which is a region box of a minimum size including a predetermined object from an image photographed by a photographing unit by a region detector;
    measuring a size of the object region box and estimating a distance between the predetermined object and the photographing unit on the basis of an interpolating function interpolating a relationship of the size of the object region box and distances up to the photographing unit and the predetermined object by a distance estimator; and
    generating object position information for estimating the position of the predetermined object on the basis of a first vector based on the distances up to the predetermined object and the photographing unit, a rotation angle of the photographing unit, a second vector based on a center point of the photographed image and a center point of the object region box, and position information of the photographing unit by a position estimator.

11. The method for estimating a position of an object based on a single camera image according to claim 10, further comprising deducing and storing a linear interpolating function based on the size of the object region box and distance data between the predetermined objects and the photographing unit actually measured at two points in advance.

12. The method for estimating a position of an object based on a single camera image according to claim 10, wherein the generating the object position information sets an angle between a gaze direction of the photographing unit initially set and a gaze direction of the photographing unit at the time of photographing the predetermined object as the rotation angle.

13. The method for estimating a position of an object based on a single camera image according to claim 10, wherein the generating the object position information sets a vector calculated by setting the estimated distance between the predetermined object and the photographing unit as a size and a direction of a line linking the photographing unit and the photographed image as a direction as the first vector.

14. The method for estimating a position of an object based on a single camera image according to claim 10, wherein the generating the object position information calculates a vector directing the center point of the photographed image to the center point of the object region box, and modifies the calculated vector on the basis of a ratio of the distance between the center point of the photographed image and the object region box and a distance between an actual gaze center line of the photographing unit and the center point of the object and sets the modified vector as the second vector.

15. The method for estimating a position of an object based on a single camera image according to claim 10, wherein the generating the object position information generates a third vector rotating the first vector at the rotation angle and generates object position information estimating the position of the predetermined object on the basis of a fourth vector acquired by summing up the third vector and the second vector and the position information of the photographing unit.

* * * * *